United States Patent
Otake

(10) Patent No.: US 9,461,831 B2
(45) Date of Patent: Oct. 4, 2016

(54) PACKET FORWARDING SYSTEM, CONTROL APPARATUS, PACKET FORWARDING METHOD, AND PROGRAM

(75) Inventor: Takahiro Otake, Tokyo (JP)

(73) Assignee: NEC Corporation, Tokyo (JP)

( * ) Notice: Subject to any disclaimer, the term of this patent is extended or adjusted under 35 U.S.C. 154(b) by 128 days.

(21) Appl. No.: 14/237,849

(22) PCT Filed: Aug. 10, 2012

(86) PCT No.: PCT/JP2012/070429
§ 371 (c)(1),
(2), (4) Date: Feb. 7, 2014

(87) PCT Pub. No.: WO2013/022082
PCT Pub. Date: Feb. 14, 2013

(65) Prior Publication Data
US 2014/0192807 A1    Jul. 10, 2014

(30) Foreign Application Priority Data

Aug. 11, 2011 (JP) .................................. 2011-176226

(51) Int. Cl.
*H04L 12/28* (2006.01)
*H04L 12/18* (2006.01)
*H04L 12/801* (2013.01)
*H04L 12/761* (2013.01)
*H04L 12/717* (2013.01)

(52) U.S. Cl.
CPC ............... *H04L 12/18* (2013.01); *H04L 45/16* (2013.01); *H04L 47/10* (2013.01); *H04L 45/42* (2013.01)

(58) Field of Classification Search
None
See application file for complete search history.

(56) References Cited

U.S. PATENT DOCUMENTS

| 2002/0181397 | A1* | 12/2002 | Licht ............................ 370/230 |
| 2002/0194367 | A1* | 12/2002 | Nakamura et al. ........... 709/238 |
| 2004/0146056 | A1* | 7/2004 | Martin ........................ 370/401 |
| 2005/0198297 | A1* | 9/2005 | Tzeng .......................... 709/226 |
| 2006/0133264 | A1* | 6/2006 | Yamauchi .................... 370/216 |
| 2007/0291649 | A1* | 12/2007 | Nabae .......................... 370/237 |

(Continued)

FOREIGN PATENT DOCUMENTS

| EP | 1 162 788 A2 | 12/2001 |
| JP | 2011-103592 A | 5/2011 |
| WO | WO 2008/095010 A1 | 8/2008 |

OTHER PUBLICATIONS

Nick McKeown, et al, "OpenFlow: Enabling Innovation in Campus Networks," [online], [searched on Jul. 26, 2011], Internet <URL: http://www.openflow.org/documents/openflow-wp-latest.pdf>.
"OpenFlow Switch Specification" Version 1.1.0 Implemented (Wire Protocol 0x02) [searched on Jul. 26, 2011], Internet <URL:http://www.openflow.org/documents/openflow-spec-v1.1.0.pdf>.
Huawei-3Com ga Telan suru Tsugino 5 Nen 0 Mikoshita Network Kiki Erabi, Network Magazine, vol. 10, No. 6, Jun. 1, 2005, pp. 20-23.

(Continued)

*Primary Examiner* — Otis L Thompson, Jr.
(74) *Attorney, Agent, or Firm* — McGinn IP Law Group, PLLC

(57) ABSTRACT

A packet forwarding system includes: first relay apparatuses that are connected to each other; a second relay apparatus that includes ports and that is connected to first relay apparatuses; and a control apparatus that configures a trunk serving as virtual logical link by using physical links among first and second relay apparatuses. The control apparatus determines a designated port from ports of first relay apparatuses included in the trunk. When a relay apparatus included in the first relay apparatuses receives a predetermined control target packet, the control apparatus controls the first relay apparatuses to transmit a received control target packet via relay apparatus having the designated port.

13 Claims, 16 Drawing Sheets

(56) References Cited

U.S. PATENT DOCUMENTS

| | | |
|---|---|---|
| 2008/0126536 A1* | 5/2008 | Sakurai .................. 709/224 |
| 2010/0034086 A1* | 2/2010 | Gawande et al. ............ 370/235 |
| 2011/0013551 A1 | 1/2011 | Shiroko et al. |
| 2011/0110369 A1 | 5/2011 | Shiraki |
| 2012/0275297 A1* | 11/2012 | Subramanian ................ 370/225 |
| 2014/0003423 A1* | 1/2014 | Assarpour et al. ........... 370/389 |

OTHER PUBLICATIONS

Hiroyuki Nemoto, Sever kara Network, Storage made Boom O Mukaeta 'Kasoka' tte Nandaro?, Nikkei Network, No. 101, Aug. 28, 2008, pp. 52-59.

International Search Report in PCT/JP2012/070429 dated Sep. 11, 2012.

Extended European Search Report dated Apr. 17, 2015.

* cited by examiner

FIG. 3

| RELAY APPARATUS | MEMBER PORT | EAST STACK LINK PORT | WEST STACK LINK PORT |
|---|---|---|---|
| 1101 | #1 | #2 | #3 |
| 1102 | #4 | #5 | #6 |
| 1103 | #3 | #1 | #2 |

FIG. 4

| INPUT PORTS | PROCESSING CONTENTS(INSTRUCTIONS) |
|---|---|
| DESIGNATED PORT | FORWARDING FROM PORT CONNECTED TO NEXT-HOP RELAY APPARATUS ON BC FORWARDING PATH |
| EAST STACK LINK PORT | FORWARDING FROM PORT CONNECTED TO NEXT-HOP RELAY APPARATUS ON BC FORWARDING PATH |
| WEST STACK LINK PORT | FORWARDING FROM PORT CONNECTED TO NEXT-HOP RELAY APPARATUS ON BC FORWARDING PATH |

FIG. 5

| INPUT PORTS | PROCESSING CONTENTS (INSTRUCTIONS) |
|---|---|
| MEMBER PORT | FORWARDING FROM EAST STACK LINK PORT |
| EAST STACK LINK PORT | FORWARDING FROM WEST STACK LINK PORT |
| WEST STACK LINK PORT | FORWARDING FROM EAST STACK LINK PORT |

FIG. 6

| INPUT PORTS | PROCESSING CONTENTS(INSTRUCTIONS) |
|---|---|
| MEMBER PORT | FORWARDING FROM EAST STACK LINK PORT |
| EAST STACK LINK PORT | DISCARD |
| WEST STACK LINK PORT | DISCARD |

FIG. 7

| INPUT PORTS | PROCESSING CONTENTS(INSTRUCTIONS) |
|---|---|
| MEMBER PORT | FORWARDING FROM WEST STACK LINK PORT |
| EAST STACK LINK PORT | DISCARD |
| WEST STACK LINK PORT | FORWARDING FROM WEST STACK LINK PORT |

PACKET FORWARDING SYSTEM, CONTROL APPARATUS, PACKET FORWARDING METHOD, AND PROGRAM

REFERENCE TO RELATED APPLICATION

The present invention is based upon and claims the benefit of the priority of Japanese patent application No. 2011-176226, filed on Aug. 11, 2011, the disclosure of which is incorporated herein in its entirety by reference thereto.

The present invention relates to a packet forwarding system, a control apparatus, a packet forwarding method, and a program. In particular, it relates to; a packet forwarding system in which a trunk(s) serving as a virtual logical link(s) is configured by a plurality of physical links; a control apparatus; a packet forwarding method; and a program.

BACKGROUND

In recent years, a technique referred to as OpenFlow has been proposed (see Patent Literature 1 and Non-Patent Literatures 1 and 2). OpenFlow recognizes communications as end-to-end flows and performs path control, failure recovery, load balancing, and optimization on a per-flow basis. Each OpenFlow switch according to Non-Patent Literature 2 has a secure channel for communication with an OpenFlow controller and operates according to a flow table suitably added or rewritten by the OpenFlow controller. In the flow table, a set of the following three is defined for each flow: matching rules (Header Fields) against which a packet header is matched; flow statistical information (Counters); and Instructions that define a processing content (see FIG. 16).

For example, when an OpenFlow switch receives a packet, the OpenFlow switch searches the flow table for an entry having a matching rule (see Header Fields in FIG. 16) that matches header information of the incoming packet. If, as a result of the search, the OpenFlow switch finds an entry matching the incoming packet, the OpenFlow switch updates the flow statistical information (Counters) and processes the incoming packet based on a processing content (packet transmission from a specified port, flooding, drop, etc.) written in the Instructions field of the entry. If, as a result of the search, the OpenFlow switch does not find an entry matching the incoming packet, the OpenFlow switch transmits an entry setting request to the OpenFlow controller via the secure channel. Namely, the OpenFlow switch requests the OpenFlow controller to determine a processing content for the incoming packet. The OpenFlow switch receives a flow entry defining a processing content and updates the flow table. In this way, by using an entry stored in the flow table as a processing rule, the OpenFlow switch executes packet forwarding.

To realize broadcast and multicast by using the network disclosed in the above Patent Literature 1, Non-Patent Literature 1, or Non-Patent Literature 2, flow entries for forwarding packets from a plurality of ports need to be set in each OpenFlow switch.

Patent Literature 1:
International Publication No. 2008/095010

Non-Patent Literature 1:
Nick McKeown, and seven others, "OpenFlow: Enabling Innovation in Campus Networks," [online], [searched on Jul. 26, 2011], Internet <URL: http://www.openflow.org/documents/openflow-wp-latest.pdf>

Non-Patent Literature 2:
"OpenFlow Switch Specification" Version 1.1.0 Implemented (Wire Protocol 0x02) [searched on Jul. 26, 2011], Internet <URL:http://www.openflow.org/documents/openflow-spec-v1.1.0.pdf>

SUMMARY

The following analysis has been given by the present inventor. For example, when an OpenFlow switch is added to the network disclosed in the above Patent Literature 1, Non-Patent Literature 1, or Non-Patent Literature 2, an ex-post facto change could be made to the network topology. If an OpenFlow switch has a flow table including a flow entry matching an incoming packet, the OpenFlow switch does not request the OpenFlow controller to set a flow entry. Thus, if the network topology is changed, broadcast packets could not be forwarded to OpenFlow switches which have been newly added or to OpenFlow switches whose connection has been changed.

For this reason, as to forwarding of broadcast packets, it is desirable that broadcast delivery paths be calculated when the network topology is changed and that flow entries for broadcast packets be set in OpenFlow switches on each path.

With the techniques disclosed in the above Patent Literature 1, Non-Patent Literature 1, and Non-Patent Literature 2, by setting appropriate flow entries (for example, for forwarding certain packets to a single destination) in a plurality of OpenFlow switches having parallel links and by grouping these links, it is possible to configure a trunk serving as a virtual logical link.

However, there are cases where an apparatus located at an end of the above trunk is a communication apparatus that is not under control of the OpenFlow controller. In such cases, since each OpenFlow switch forwards broadcast packets in accordance with a flow entry included therein, the same packet could be transmitted to a certain destination a plurality of times. In addition, if no such flow entry for broadcast packets is set, broadcast packets could be forwarded along unintended paths by other flow entries.

Therefore, there is a need in the art to provide a configuration capable of causing relay apparatuses (corresponding to the above OpenFlow switches), which form a trunk with an external relay apparatus that is not under control of a control apparatus, to appropriately forward predetermined control target packets such as broadcast packets or multicast packets.

According to a first aspect of the present invention, there is provided a packet forwarding system, comprising: a group of first relay apparatuses that are connected to each other; a second relay apparatus that comprises a plurality of ports and that is connected to each of the first relay apparatuses; and a control apparatus that configures a trunk(s) serving as a virtual logical link(s) by using physical links among the first and second relay apparatuses. The control apparatus determines a designated port from ports of the first relay apparatuses included in the trunk. When a relay apparatus included in the group of first relay apparatuses receives a predetermined control target packet, the control apparatus controls the group of first relay apparatuses to transmit the received control target packet via a relay apparatus having the designated port.

According to a second aspect of the present invention, there is provided a control apparatus, which is connected to a group of first relay apparatuses that are connected to each other and a second relay apparatus that comprises a plurality of ports and that is connected to each of the first relay apparatuses and which configures a trunk(s) serving as a virtual logical link(s) by using physical links among the first and second relay apparatuses. The control apparatus determines a designated port from ports of the first relay apparatuses included in the trunk. The control apparatus controls, when a relay apparatus included in the group of first relay apparatuses receives a predetermined control target packet, the group of first relay apparatuses to transmit the received control target packet via a relay apparatus having the designated port.

According to a third aspect of the present invention, there is provided a packet forwarding method, comprising: by a control apparatus, which is connected to a group of first relay apparatuses that are connected to each other and a second relay apparatus that has a plurality of ports and that is connected to each of the first relay apparatuses and which configures a trunk(s) serving as a virtual logical link(s) by using physical links among the first and second relay apparatuses, determining a designated port from ports of the first relay apparatuses included in the trunk; and controlling, when a relay apparatus included in the group of first relay apparatuses receives a predetermined control target packet, the group of first relay apparatuses to transmit the received control target packet via a relay apparatus having the designated port.

According to a fourth aspect of the present invention, there is provided a program, causing a computer constituting a control apparatus, which is connected to a group of first relay apparatuses that are connected to each other and a second relay apparatus that comprises a plurality of ports and that is connected to each of the first relay apparatuses and which configures a trunk(s) serving as a virtual logical link(s) by using physical links among the first and second relay apparatuses, to execute: determining a designated port from ports of the first relay apparatuses included in the trunk; and controlling, when a relay apparatus included in the group of first relay apparatuses receives a predetermined control target packet, the group of first relay apparatuses to transmit the received control target packet via a relay apparatus having the designated port. This program can be recorded in a computer-readable storage medium. Namely, the present invention can be embodied as a computer program product.

The present invention provides the following advantage, but not restricted thereto. The present invention enables relay apparatuses, which form a trunk with an external relay apparatus that is not under control of a control apparatus, to appropriately forward predetermined control target packets such as broadcast packets or multicast packets.

BRIEF DESCRIPTION OF THE DRAWINGS

FIG. 3 illustrates trunk configuration information stored in a trunk information storage unit of the control apparatus according to the first exemplary embodiment of the present invention.

FIG. 4 illustrates contents in a forwarding table of a relay apparatus having a port (member port) that has been determined to be a designated port.

FIG. 5 illustrates contents in a forwarding table of a relay apparatus having a port (member port) that has not been determined to be a designated port.

FIG. 6 illustrates contents in a forwarding table of a relay apparatus 1102 used when a failure is caused in a link between relay apparatuses 1101 and 1103.

FIG. 7 illustrates contents in a forwarding table of the relay apparatus 1103 used when a failure is caused in the link between the relay apparatuses 1101 and 1103.

Figure 1:
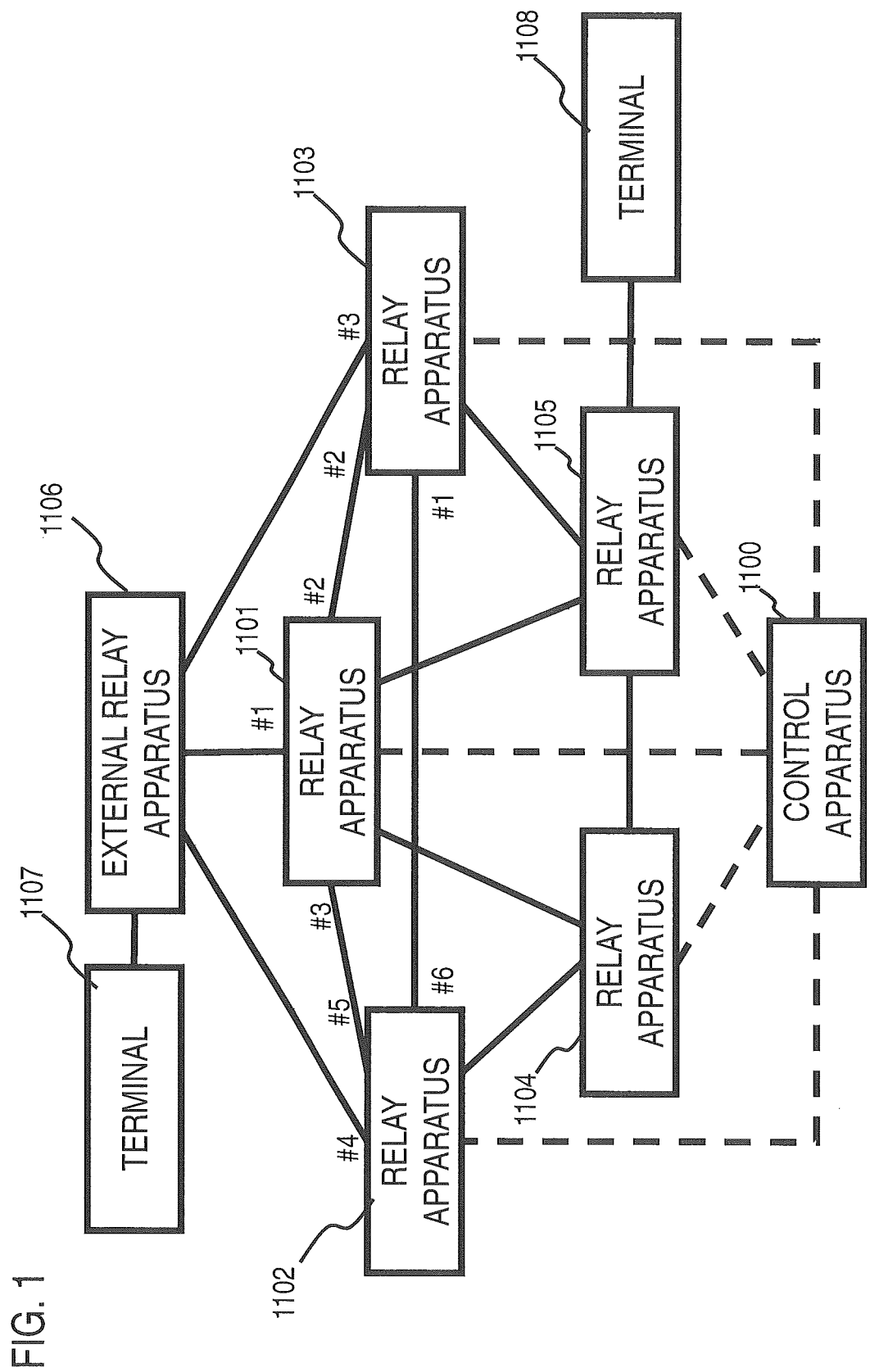
FIG. 1 illustrates a configuration according to a first exemplary embodiment of the present invention.

In the present disclosure, there are various possible modes, which include the following, but not restricted thereto. First, an outline of an exemplary embodiment of the present invention will be described with reference to the drawings. In the following outline, various elements will be described with reference characters for convenience. Namely, these reference characters are merely used as examples to facilitate understanding of the present invention. Thus, the reference characters are not intended to limit the present invention to the illustrated modes.

As illustrated in FIG. 1, an exemplary embodiment of the present invention can be realized by a configuration including: a group of first relay apparatuses 1101 to 1103 that are connected to each other; a second relay apparatus (an external relay apparatus) 1106 that has a plurality of ports and that is connected to each of the first relay apparatuses 1101 to 1103; and a control apparatus 1100 that configures a trunk(s) serving as a virtual logical link(s) by using physical links among the first and second relay apparatuses.

For example, a trunk is configured by using physical links among the external relay apparatus 1106 and the relay apparatuses 1101 to 1103 in FIG. 1. In such case, for example, the control apparatus 1100 determines a port of the relay apparatus 1101 to be a designated port, among the ports included in the trunk. When the relay apparatus 1101 receives a control target packet, the control apparatus 1100 controls the relay apparatus 1101 to forward the received control target packet along a predetermined path (see FIG. 8).

Figure 9:
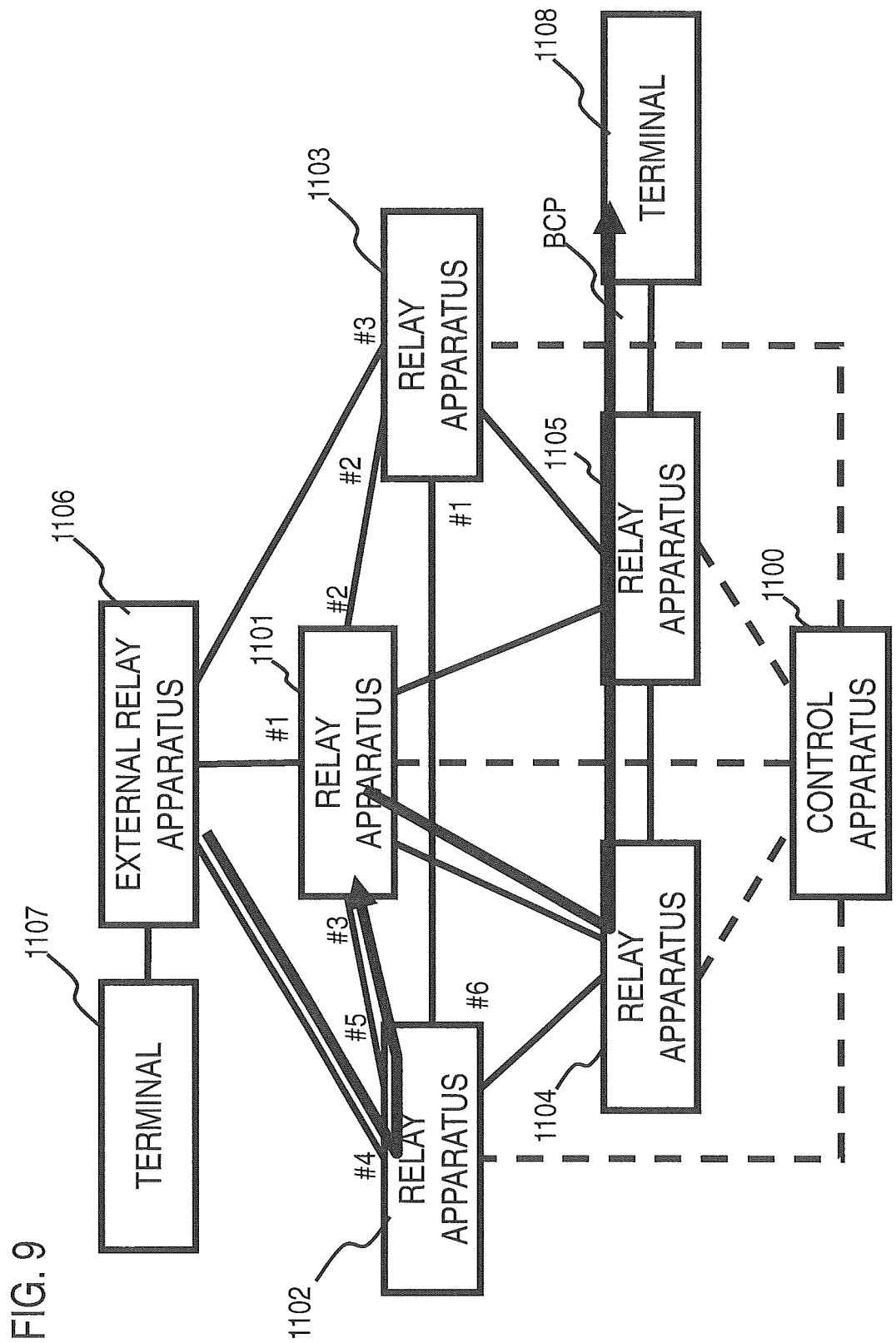
FIG. 9 illustrates a forwarding path used when a broadcast packet is forwarded from an external relay apparatus to the relay apparatus 1102.
Figure 10:
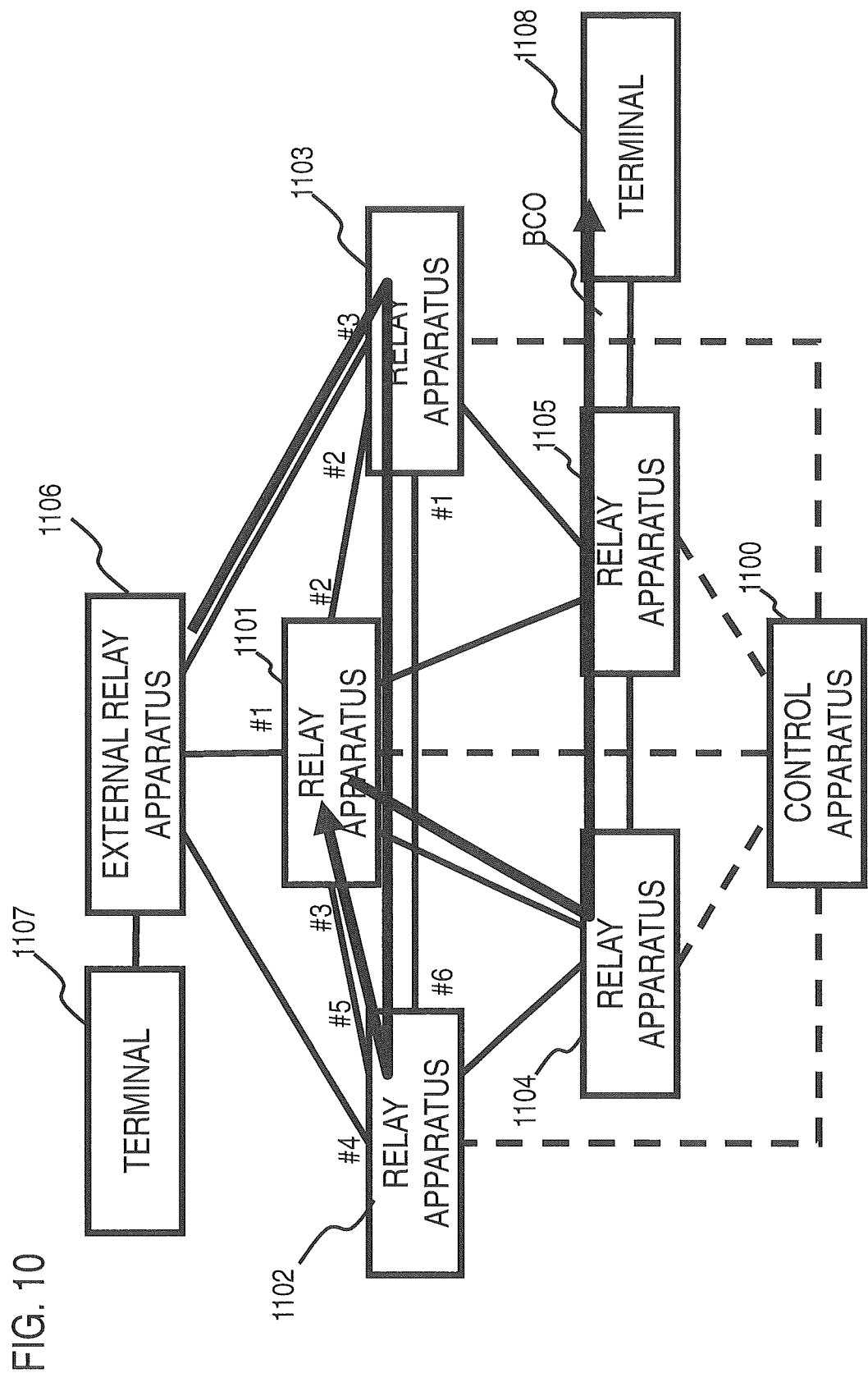
FIG. 10 illustrates a forwarding path used when a broadcast packet is forwarded from the external relay apparatus to the relay apparatus 1103.

If the first relay apparatus 1102 or 1103 receives the predetermined control target packet, the control apparatus 1100 controls the first relay apparatus 1102 or 1103 to transmit the received control target packet via the relay apparatus 1101 (see FIG. 9 and FIG. 10).

In this way, the control apparatus 1100 can control forwarding so that control target packets flowing from the trunk are not redundantly forwarded from other unintended relay apparatuses or loops are not formed.

First Exemplary Embodiment

Next, a first exemplary embodiment of the present invention will be described in detail with reference to the drawings. FIG. 1 illustrates a configuration according to the first exemplary embodiment of the present invention. FIG. 1 illustrates a packet forwarding system including: a plurality of relay apparatuses (relay apparatuses 1101 to 1105) that can control packet processing such as forwarding of incoming packets based on external commands; an external relay apparatus 1106; terminals 1107 and 1108; and a control apparatus 1100 that controls the relay apparatuses 1101 to 1105.

The relay apparatuses 1101 to 1105 are communication apparatuses connected to the control apparatus 1100 via respective control channels indicated by dashed lines. In accordance with control instructions by the control apparatus 1100, the relay apparatuses 1101 to 1105 realize communication between the terminal 1107 connected to the external relay apparatus 1106 and the terminal 1108 connected to the relay apparatus 1105. In FIG. 1, communication paths for data are indicated by solid lines and communication paths for control operations are indicated by dashed lines. However, these two kinds of paths may be mixed.

Figure 16:
FIG. 16 illustrates a configuration of a flow entry in Non-Patent Literature 2.

In the present exemplary embodiment, OpenFlow switches specified in Non-Patent Literature 2 are used as the above relay apparatuses. More specifically, each of the relay apparatuses 1101 to 1105 stores at least one flow entry in which matching rules and processing contents (Instructions) are associated with each other as illustrated in FIG. 16. In addition, in accordance with a flow entry matching an incoming packet, each of the relay apparatuses 1101 to 1105 performs packet forwarding, for example. Apparatuses other than the above OpenFlow switches may be used as the relay apparatuses. For example, it is possible to use an apparatus in which a packet path can be set by specifying an arbitrary packet matching condition on a CLI (command line interface) via Telnet.

The external relay apparatus 1106 has a function of configuring a link aggregation (see IEEE 802.3ad) (hereinafter referred to as "LAG") with a plurality of physical ports. The external relay apparatus 1106 is connected to the relay apparatuses 1101 to 1103 via physical ports included in the LAG.

For example, the terminal 1107 is a host terminal connected to the external relay apparatus 1106. In addition, the terminal 1108 is a host terminal connected to the relay apparatus 1105.

In the present exemplary embodiment, among the relay apparatuses 1101 to 1105, the relay apparatuses 1101 to 1103 connected to the external relay apparatus 1106 are connected to each other in a ring structure.

In addition, the relay apparatus 1104 is connected to the relay apparatuses 1101, 1102, and 1105. The relay apparatus 1105 is connected to the relay apparatuses 1101, 1103, and 1104.

The above network topology has been used as an example to facilitate description of the present invention. Namely, various changes can be made to the network topology. For example, the number of relay apparatuses, the number of external relay apparatuses, and the number of terminals illustrated in FIG. 1 are not particularly limited.

Figure 2:
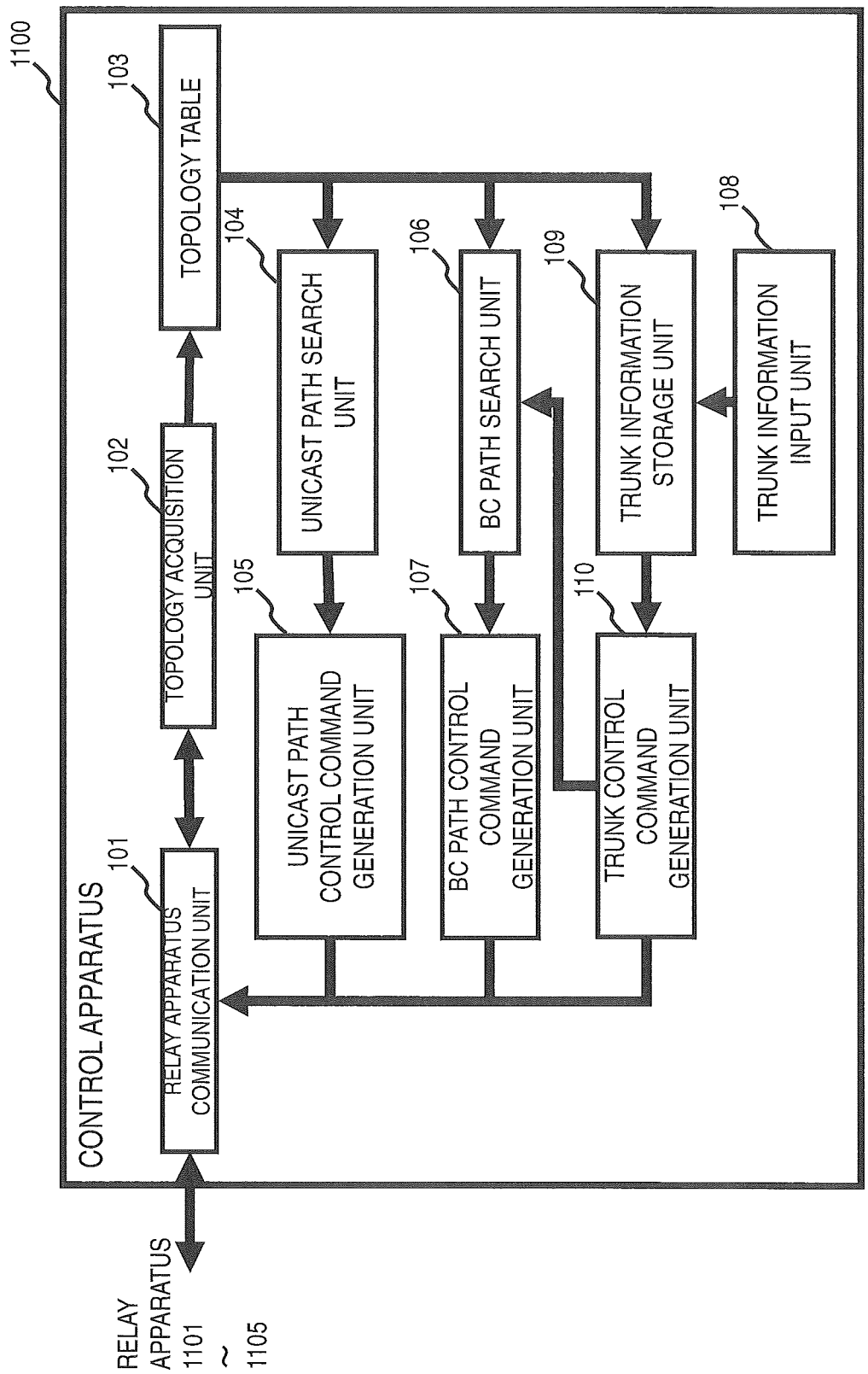
FIG. 2 is a block diagram illustrating a detailed configuration of a control apparatus according to the first exemplary embodiment of the present invention.

Next, the control apparatus 1100 in FIG. 1 will be described in detail. FIG. 2 is a block diagram illustrating a detailed configuration of the control apparatus 1100 according to the first exemplary embodiment of the present invention. As illustrated in FIG. 2, the control apparatus 1100 includes a relay apparatus communication unit 101, a topology acquisition unit 102, a topology table 103, a unicast path search unit 104, a unicast path control command generation unit 105, a broadcast path search unit (BC path search unit) 106, a broadcast path command generation unit (BC path control command generation unit) 107, a trunk information input unit 108, a trunk information storage unit 109, and a trunk control command generation unit 110.

The relay apparatus communication unit 101 transmits a control command generated by the topology acquisition unit 102, the unicast path control command generation unit 105, the BC path control command generation unit 107, or the trunk control command generation unit 110 to the relay apparatuses 1101 to 1105. In addition, the relay apparatus communication unit 101 inputs a reply from the relay apparatuses 1101 to 1105 to the topology acquisition unit 102, the unicast path control command generation unit 105, the BC path control command generation unit 107, or the trunk control command generation unit 110.

More specifically, the relay apparatus communication unit 101 establishes a control session with the relay apparatuses 1101 to 1105 and transmits/receives a control command to/from the relay apparatuses 1101 to 1105. The OpenFlow protocol described in Non-Patent Literature 2 can be used for the control command. In addition, communication may be performed by using a CLI via Telnet or SNMP (Simple Network Management Protocol).

The topology acquisition unit 102 communicates with the relay apparatuses 1101 to 1105 via the relay apparatus communication unit 101, acquires topology information representing a connection relationship among the relay apparatuses 1101 to 1105, and registers the information in the topology table 103. For example, the topology can be acquired by causing neighboring relay apparatuses to collect each other's interface information and to transmit the information to the control apparatus 1100. A typical example of such protocol is the Link Layer Discovery Protocol. In another method, the control apparatus 1100 controls a certain relay apparatus to output a packet including an ID and a port number of the certain relay apparatus from a certain port thereof, and the control apparatus 1100 receives the packet from a relay apparatus facing the certain relay apparatus. In this way, recognition among relay apparatuses can be achieved. The control apparatus can use Packet-out and Packet-in messages in Non-Patent Literature 2 to output and receive packets. Of course, a network topology may be set in advance.

The unicast path search unit 104 refers to the topology table 103 and calculates a path among relay apparatuses connected to terminals. To calculate the path, the unicast path search unit 104 can use a shortest path tree (Dijkstra's algorithm is a typical example). The unicast path search unit 104 does not necessarily calculate a single path. The unicast path search unit 104 may calculate different paths per communication unit. Alternatively, paths may be calculated in advance by using each relay apparatus as a start point or an end point, and these previously-calculated paths may be used as needed.

The unicast path control command generation unit 105 transmits a control command to the relay apparatuses on the path calculated by the unicast path search unit 104 to set the path in the relay apparatuses. For example, a FLOW Table Modification message in Non-Patent Literature 2 for rewriting a flow entry stored in a relay apparatus can be used as the control command. For example, a packet path to the terminal 1108 can be controlled by setting a flow entry in which the IP (Internet Protocol) address, the MAC (Media Access Control) address, or the TCP (Transmission Control Protocol)/UDP (User Datagram Protocol) port of the terminal 1108 in FIG. 1 is used as a matching rule and a processing content (Instructions) for outputting relevant packets from the port connected to the next relay apparatus on the path are defined.

The BC path search unit 106 calculates a spanning tree path so that packets are delivered from a relay apparatus connected to a terminal for broadcast to all the other relay apparatuses connected at least to this terminal. The BC path search unit 106 may calculate a single spanning tree path or a plurality of spanning tree paths per network. When calculating a plurality of spanning tree paths, the BC path search unit 106 may calculate a different spanning tree path per relay apparatus connected to the terminal. To calculate a spanning tree, the BC path search unit 106 can use a minimum spanning tree (Prim's algorithm and Kruskal's algorithm are typical examples). In this calculation, if a relay apparatus is not connected to the terminal and is an end node, this relay apparatus is eliminated. By repeating this operation, relay apparatuses that do not exist between the relay apparatuses connected to the terminals may be eliminated. In addition, when receiving a result of selection of a designated port from the trunk control command generation unit 110, the BC path search unit 106 recalculates a path so that the designated port is included in the path.

The BC path control command generation unit 107 performs broadcast delivery path control processing and broadcast packet permission processing. The broadcast delivery path control processing is performed for establishing a broadcast path. In this processing, flow entries are set in relay apparatuses, as is the case with the above unicast path. A priority lower than that set in a unicast flow entry is set in a broadcast flow entry. In this way, packets that do not match any unicast flow entries and that match a broadcast flow entry are processed for broadcast.

As the broadcast packet permission processing, processing for permitting forwarding of a broadcast packet from a terminal along a broadcast delivery path and processing for controlling relay apparatuses to write information representing the broadcast packet in an arbitrary field of the packet are performed. For example, the broadcast packet permission processing can be realized by setting a flow entry for rewriting the first bit (I/G bit) of a destination MAC address to 1 in a relay apparatus located at an entry near a terminal.

Alternatively, the unicast path control command generation unit 105 and/or the BC path control command generation unit 107 may cause a relay apparatus located at an entry near a terminal to change an arbitrary field so that delivery along a unicast path and delivery along a broadcast path can be distinguished (Unicast/BC delivery flag). In addition, in this case, a relay apparatus located at an exit near the destination terminal may be configured to rewrite the arbitrary field to the original value. This field to be changed may be the IP Tos field, VLAN Priority field, or the like.

Alternatively, a relay apparatus located at an entry near a terminal may be configured to degenerate an arbitrary address and insert a Unicast/BC delivery flag in this degenerated address. For example, the destination MAC address may be degenerated, and a degenerated MAC address and the distinction flag may be inserted in the destination MAC address. In this case, a relay apparatus located at an exit on the destination terminal needs to restore the original address from the degenerated address.

Alternatively, between unicast and multicast, a different VLAN ID may be allocated. For example, a VLAN ID may be converted to a separately-allocated dedicated VLAN ID, an ID in which a destination MAC address and an original VLAN ID are degenerated may be generated, and the destination MAC may be used as this degenerated ID.

Delivery along a unicast path and delivery along a broadcast path can be distinguished by changing such an arbitrary field. Thus, by performing the broadcast delivery path control processing, a unicast packet whose destination is unknown can be delivered along a broadcast delivery path.

The trunk information input unit 108 receives input of trunk configuration information about relay apparatuses by using a CLI, a GUI (graphical user interface), or the like.

The trunk information storage unit 109 stores trunk configuration information inputted to the trunk information input unit 108.

FIG. 3 illustrates trunk configuration information stored in the trunk information storage unit. FIG. 3 specifies, regarding the relay apparatuses that are included in the trunk, member port information about ports (of the relay apparatuses) (hereinafter referred to as "member ports") connected to the external relay apparatus 1106 and stack link port information about ports connected among the relay apparatuses included in the trunk for packet sneaking prevention processing for preventing packets from sneaking into unintended ports when the trunk is configured. In addition, in FIG. 3, as stack link ports, two EAST and WEST ports are specified for each relay apparatus. An EAST stack link port is connected to a WEST stack link port of another relay apparatus included in the trunk. In this way, links among the stack link ports included in the trunk are connected to each other in a ring structure.

For example, in FIG. 3, port #1 of the relay apparatus 1101, port #4 of the relay apparatus 1102, and port #3 of the relay apparatus 1103 are used as member ports. This indicates, as illustrated in FIG. 1, port #1 of the relay apparatus 1101, port #4 of the relay apparatus 1102, and port #3 of the relay apparatus 1103 are connected to the external relay apparatus 1106 to form the trunk. In addition, port #2 of the relay apparatus 1101 is used as the EAST stack link port thereof. As illustrated in FIG. 1, this EAST stack link port is connected to port #2, which is the WEST stack link port of the relay apparatus 1103. In addition, as the WEST stack link port of the relay apparatus 1101, port #3 of the relay apparatus 1101 is connected to port #5, which is the EAST stack link port of the relay apparatus 1102. Likewise, as the WEST stack link port of the relay apparatus 1102, port #6 of the relay apparatus 1102 is connected to port #1 as the EAST stack link port of the relay apparatus 1103. In this way, a ring is configured.

While FIG. 3 illustrates a set of trunk configuration information, if a plurality of trunks are configured in a network (see FIGS. 13 to 15), the trunk information storage unit 109 can store a plurality of sets of trunk configuration information.

The trunk control command generation unit 110 performs designated-port selection processing and stack link control processing. In the designated-port selection processing, a single designated port is selected from the member ports stored in the trunk information storage unit 109. When selecting a designated port from the member ports, the trunk control command generation unit 110 refers to the topology table 103 and determines whether each member port as a candidate can communicate with the external relay apparatus 1106.

The BC path search unit 106 is also notified of the selected designated port. The BC path search unit 106 recalculates a broadcast delivery path. For example, the designated-port selection processing is performed when trunk configuration information is inputted to the trunk information input unit 108 or when a failure is caused in a designated port and the trunk control command generation unit 110 is notified by the topology table 103 of change of the physical topology relating to the designated port.

In the stack link control processing, based on presence of a designated port of a relay apparatus or a failure in a stack link port, the trunk control command generation unit 110 sets a flow entry instructing a forwarding destination of broadcast packets received from the member port and stack link ports in the relay apparatuses 1101 to 1103 included in the trunk via the relay apparatus communication unit 101.

More specifically, if a broadcast packet is received via the selected designated port, transmission of the broadcast packet is permitted. However, if a broadcast packet is received via a member port that is not a designated port, transmission of the broadcast packet is prohibited. Instead, the broadcast packet is forwarded via a stack link port or the broadcast packet is discarded. In this way, outputting of a plurality of broadcast packets from the relay apparatuses having the ports included in the trunk can be prevented.

FIG. 4 illustrates contents in a forwarding table stored in a relay apparatus (for example, the relay apparatus 1101) having a port selected as a designated port (other than input ports, matching rules are omitted). Flow entries as illustrated in FIG. 4 are set in the relay apparatus having a port selected as a designated port so that, when any one of the designated port and the stack link ports receives a broadcast packet, the relay apparatus forwards the packet to the next-hop relay apparatus on the broadcast forwarding path.

FIG. 5 illustrates contents in a forwarding table stored in a relay apparatus (for example, the relay apparatus 1102/1103) whose member port is not selected as a designated port (other than input ports, matching rules are omitted). Flow entries as illustrated in FIG. 5 are set in the relay apparatus so that, when the relay apparatus receives a broadcast packet via the member port or the WEST stack link port, the relay apparatus forwards the broadcast packet via the EAST stack link port. In addition, as illustrated in FIG. 5, when the relay apparatus receives a broadcast packet via the EAST stack link port, the relay apparatus forwards the broadcast packet via the WEST stack link port.

As described above, the relay apparatus whose member port is not selected as a designated port forwards a broadcast packet to a neighboring relay apparatus via a stack link port. When the broadcast packet reaches a relay apparatus having a designated port, this relay apparatus having a designated port forwards the packet along a broadcast path.

In addition, in the stack link control processing performed by the trunk control command generation unit 110, a failure of a stack link port is also taken into account. FIG. 6 illustrates contents in a forwarding table stored in a relay apparatus (for example, the relay apparatus 1102/1103) whose member port is not selected as a designated port when a failure is caused in the WEST stack link port (other than input ports, matching rules are omitted). Flow entries as illustrated in FIG. 6 are set in the relay apparatus so that, when the relay apparatus receives a packet via a member port, the relay apparatus forwards the packet via the EAST stack link port. In addition, as illustrated in FIG. 6, when the relay apparatus receives a packet via the EAST stack link port or the WEST stack link port, the relay apparatus discards the packet.

FIG. 7 illustrates contents in a forwarding table stored in a relay apparatus (for example, the relay apparatus 1102/1103) whose member port is not selected as a designated port when a failure is caused in the EAST stack link port (other than input ports, matching rules are omitted). Flow entries as illustrated in FIG. 7 are set in the relay apparatus so that, when the relay apparatus receives a packet via the member port or the WEST stack link port, the relay apparatus forwards the packet via the WEST stack link port. In addition, as illustrated in FIG. 7, when the relay apparatus receives a packet via the EAST stack link port, the relay apparatus discards the packet.

By setting the flow entries as illustrated in FIGS. 6 and 7, if a single point of failure is caused in a stack link port between the relay apparatuses 1101 and 1103 configuring a ring, a packet forwarded from an EAST stack link port to a WEST stack link port is returned by a relay apparatus having a malfunctioning EAST stack link port and is forwarded to a relay apparatus having a designated port. A packet forwarded from a WEST stack link port to an EAST stack link port is discarded by a relay apparatus having a malfunctioning WEST stack link port. Thus, it is possible to prevent a packet from making a loop.

The above control apparatus 1100 can be configured by adding the BC path search unit 106, the BC path control command generation unit 107, the trunk information input unit 108, the trunk information storage unit 109, and the trunk control command generation unit 110 to a configuration based on the OpenFlow controller in Non-Patent Literature 1 and Non-Patent Literature 2.

In addition, each unit (processing means) of the control apparatus 1100 in FIG. 2 can be realized by a computer program that causes a computer constituting the control apparatus 1100 to use hardware of the computer and perform each of the above processing.

Figure 8:
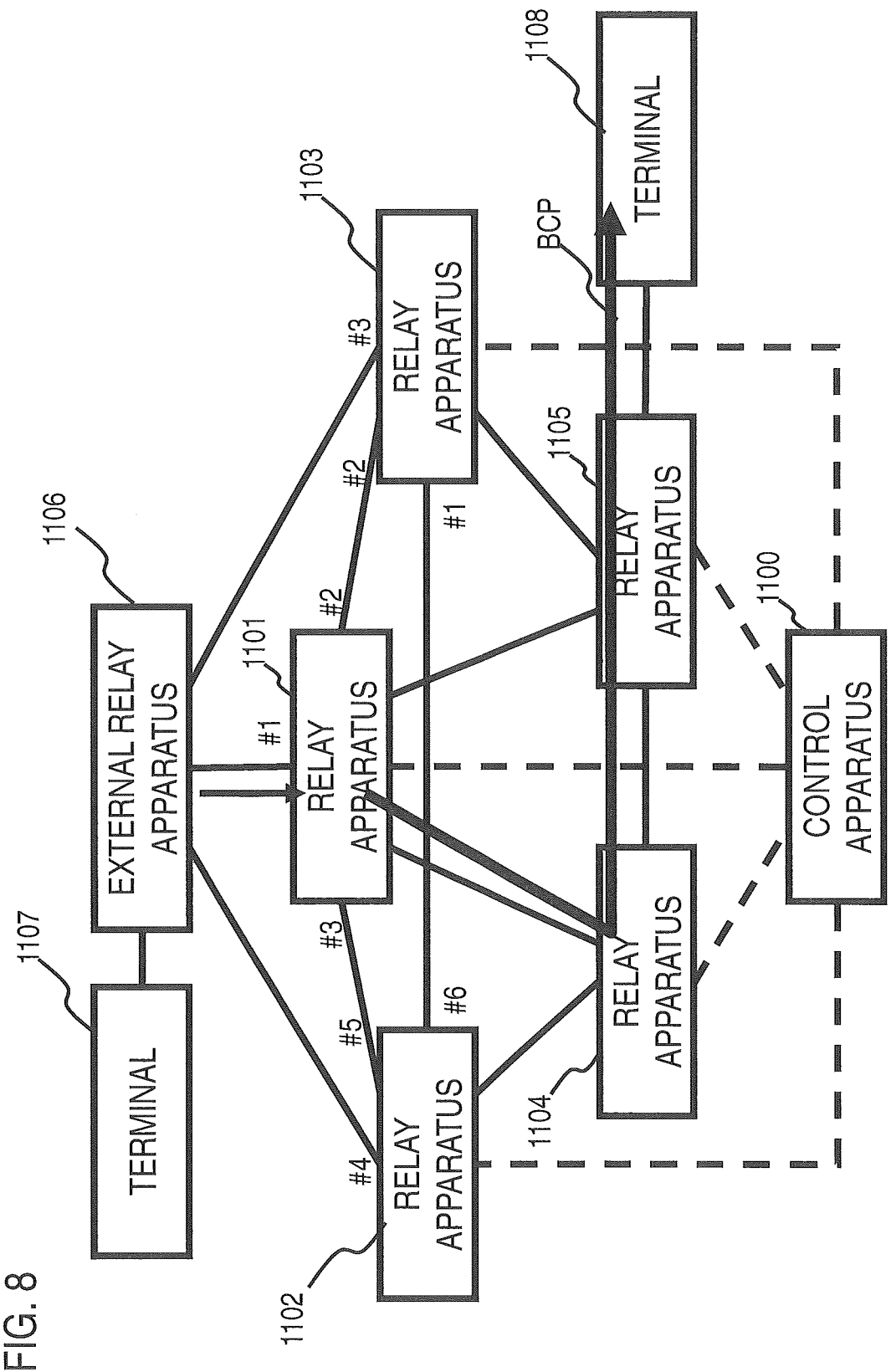
FIG. 8 illustrates a broadcast packet forwarding path.

Next, an operation according to the present exemplary embodiment will be described in detail with reference to the drawings. As illustrated in FIG. 8, the following description will be made assuming that a path for forwarding a broadcast packet transmitted from the terminal 1107 to the terminal 1108 via the external relay apparatus 1106 via the relay apparatus 1101, the relay apparatus 1104, and the relay apparatus 1105 has already been calculated (see a solid line in FIG. 8). In addition, the following description will be made assuming that a member port of the relay apparatus 1101 has already been selected as a designated port, as a result of the designated-port selection processing.

When the terminal 1107 in FIG. 8 transmits a broadcast packet to the external relay apparatus 1106, the external relay apparatus 1106 forwards the packet to the designated port of the relay apparatus 1101 among the ports included in the LAG.

In accordance with the flow entries in FIG. 4, the relay apparatus 1101 forwards the broadcast packet from a port connected to the relay apparatus 1104, which is the next-hop relay apparatus on the broadcast forwarding path. The relay apparatus 1104 forwards the packet to the relay apparatus 1105 in accordance with a flow entry realizing the broadcast forwarding path set by the control apparatus 1100. Likewise, the relay apparatus 1105 forwards the packet to the terminal 1108 in accordance with a flow entry realizing the broadcast forwarding path set by the control apparatus 1100. As a result, the broadcast packet is forwarded as indicated by an arrow in FIG. 8.

FIG. 9 illustrates a forwarding path used when the external relay apparatus 1106 receives a broadcast packet from the terminal 1107 and forwards the broadcast packet to a member port of the relay apparatus 1102 among the ports included in the LAG.

In this case, the relay apparatus 1102 forwards the packet from the EAST stack link port (port #5 in FIG. 9) thereof (the relay apparatus 1102), in accordance with the flow entries in FIG. 5. After receiving the packet, the relay apparatus 1101 forwards the broadcast packet from a port connected to the relay apparatus 1104, which is the next-hop relay apparatus on the broadcast forwarding path, in accordance with the flow entries in FIG. 4. Thereafter, as is the case with the path in FIG. 8, the broadcast packet is forwarded along the broadcast path.

FIG. 10 illustrates a forwarding path used when the external relay apparatus 1106 receives a broadcast packet from the terminal 1107 and forwards the packet to a member port of the relay apparatus 1103 among the ports included in the LAG.

In this case, the relay apparatus 1103 forwards the packet from the EAST stack link port (port #1 in FIG. 10) thereof (the relay apparatus 1103), in accordance with the flow entries in FIG. 5. After receiving the packet, the relay apparatus 1102 forwards the packet from the EAST stack link port (port #5 in FIG. 10) thereof (the relay apparatus 1102) in accordance with the flow entries in FIG. 5. After receiving the packet, the relay apparatus 1101 forwards the broadcast packet from a port connected to the relay apparatus 1104, which is the next-hop relay apparatus on the broadcast forwarding path, in accordance with the flow entries in FIG. 4. Thereafter, as is the case with the path in FIG. 8, the broadcast packet is forwarded along the broadcast path.

Figure 11:
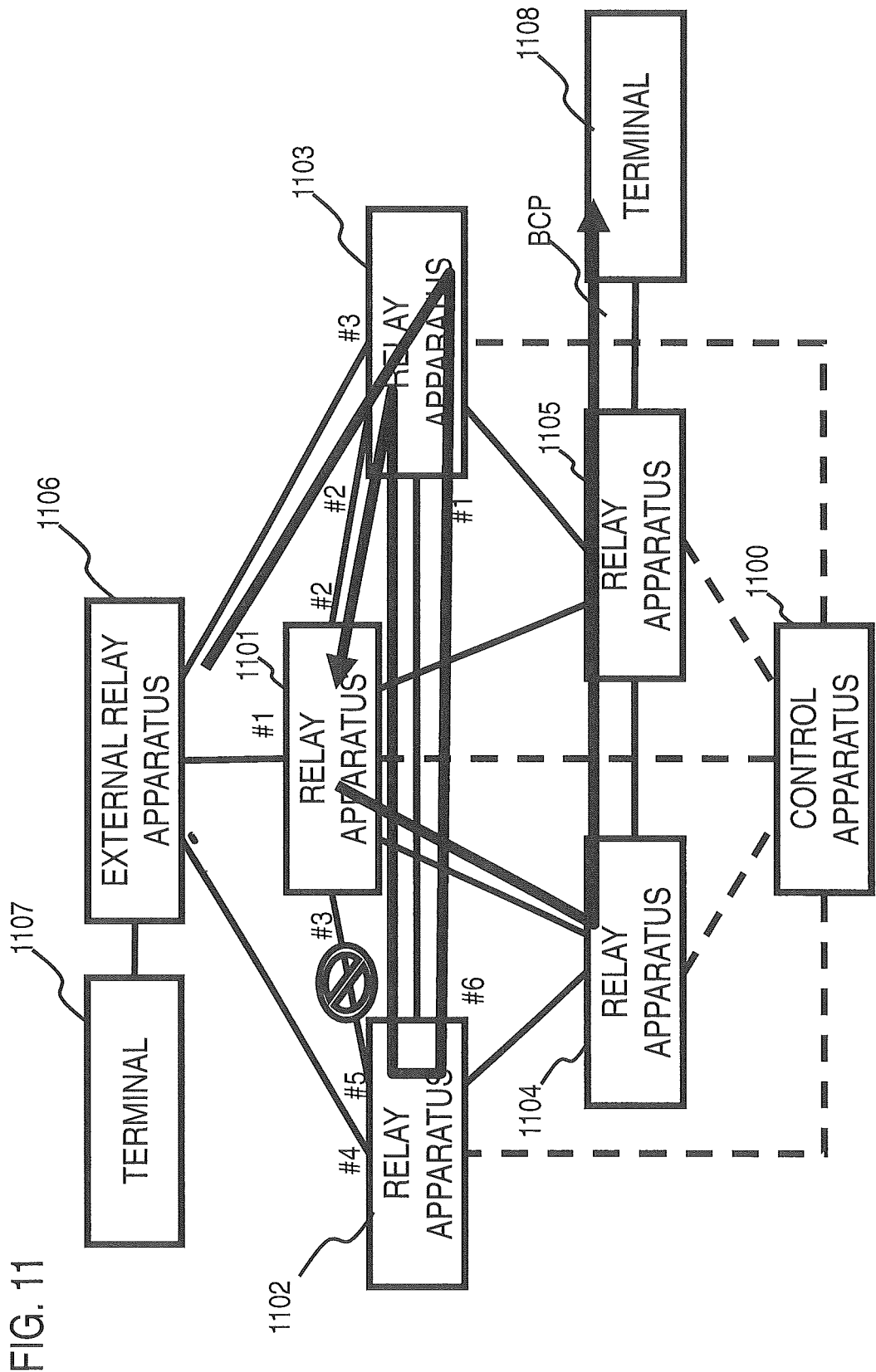
FIG. 11 illustrates a forwarding path used when a failure is caused in a stack link.

FIG. 11 illustrates a forwarding path used when a failure is caused in the stack link between the relay apparatuses 1101 and 1102 and when the external relay apparatus 1106 having received a broadcast packet from the terminal 1107 forwards the packet to a member port of the relay apparatus 1103 among the ports included in the LAG.

In this case, the relay apparatus 1103 forwards the packet from the EAST stack link port (port #1 in FIG. 11) thereof (the relay apparatus 1103), in accordance with the flow entries in FIG. 5. The flow entries as illustrated in FIG. 7 are set in the relay apparatus 1102 that has received the packet, since a failure is caused in the EAST stack link port (port #5 in FIG. 11) of the relay apparatus 1102, as illustrated in FIG. 11. Thus, the relay apparatus 1102 returns the packet to the relay apparatus 1103 from the WEST stack link port (port #6 in FIG. 11) thereof (the relay apparatus 1102), in accordance with the flow entries in FIG. 7. After receiving the packet, the relay apparatus 1103 forwards the packet from the WEST stack link port (port #2 in FIG. 11) thereof (the relay apparatus 1103), in accordance with the flow entries in FIG. 5. After receiving the packet, the relay apparatus 1101 forwards the broadcast packet from a port connected to the relay apparatus 1104, which is the next-hop relay apparatus on the broadcast forwarding path, in accordance with the flow entries in FIG. 4. Thereafter, as is the case with the path in FIG. 8, the broadcast packet is forwarded along the broadcast path.

Figure 12:
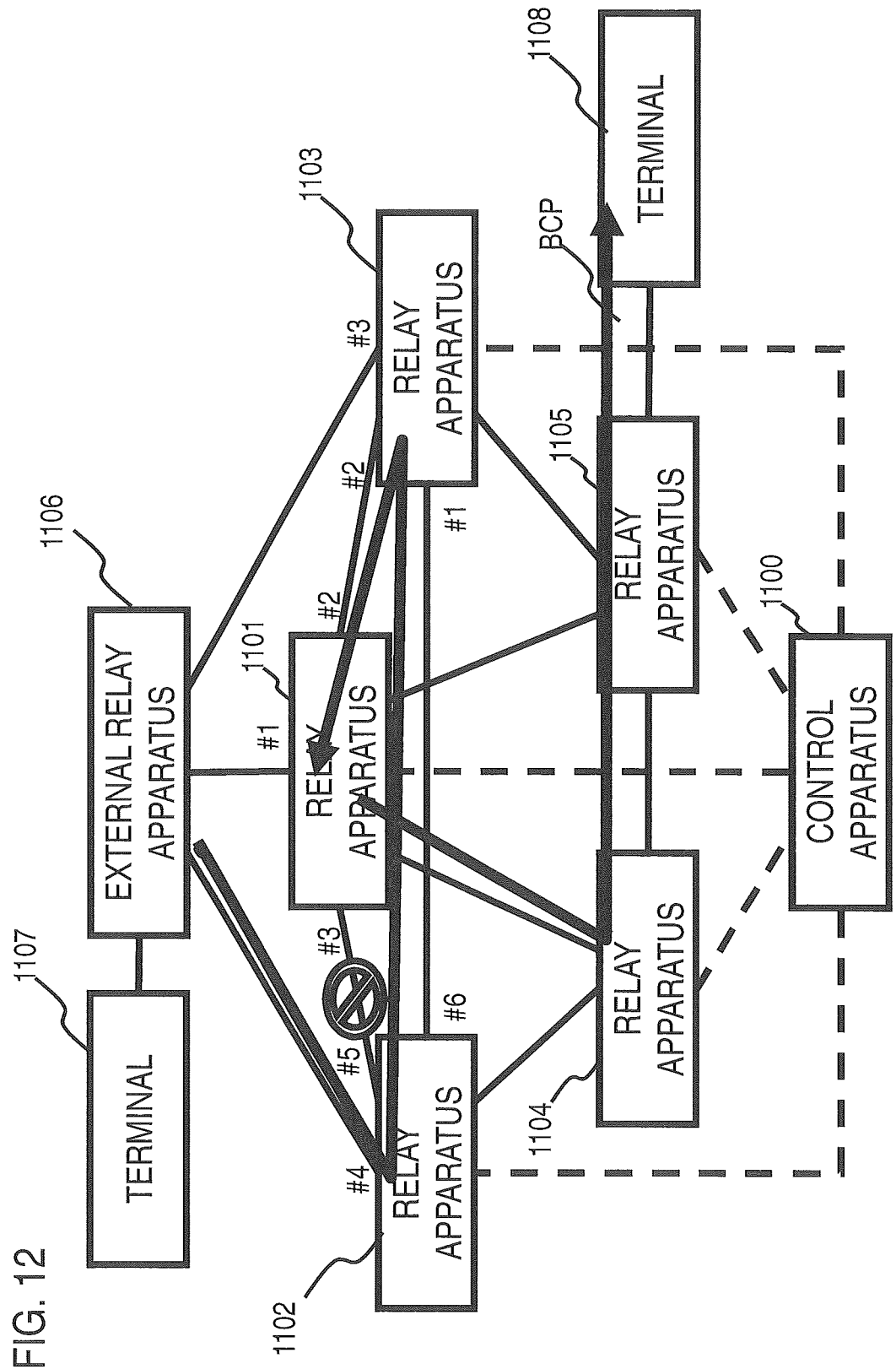
FIG. 12 illustrates another forwarding path used when a failure is caused in a stack link.

FIG. 12 illustrates a forwarding path used when a failure is caused in the stack link between the relay apparatuses 1101 and 1102 and when the external relay apparatus 1106 having received a broadcast packet from the terminal 1107 forwards the packet to a member port of the relay apparatus 1102 among the ports included in the LAG.

Since a failure is caused in the EAST stack link port (port #5 in FIG. 12) of the relay apparatus 1102 as illustrated in FIG. 12, the flow entries in FIG. 7 are set in the relay apparatus 1102. Thus, the relay apparatus 1102 forwards the packet from the WEST stack link port (port #6 in FIG. 11) thereof (the relay apparatus 1102), in accordance with the flow entries in FIG. 7. After receiving the packet, the relay apparatus 1103 forwards the packet from the WEST stack link port (port #2 in FIG. 12) thereof (the relay apparatus 1103), in accordance with the flow entries in FIG. 5. After receiving the packet, the relay apparatus 1101 forwards the broadcast packet from a port connected to the relay apparatus 1104, which is the next-hop relay apparatus on the broadcast forwarding path, in accordance with the flow entries in FIG. 4. Thereafter, as is the case with the path in FIG. 8, the broadcast packet is forwarded along the broadcast path.

Thus, according to the present exemplary embodiment, as described with reference to FIGS. 8 to 10, forwarding using stack link ports is performed, so that control target packets such as broadcast packets are outputted only from a relay apparatus having a designated port selected.

In addition, according to the present exemplary embodiment, as described with reference to FIGS. 11 and 12, even when a failure is caused in a stack link, packets can be forwarded without making a loop.

While the first exemplary embodiment of the present invention has thus been described, the present invention is not limited thereto. Various variations can be made as other exemplary embodiments. Hereinafter, some other exemplary embodiments in which a plurality of trunks are included will be described.

Second Exemplary Embodiment

Figure 13:
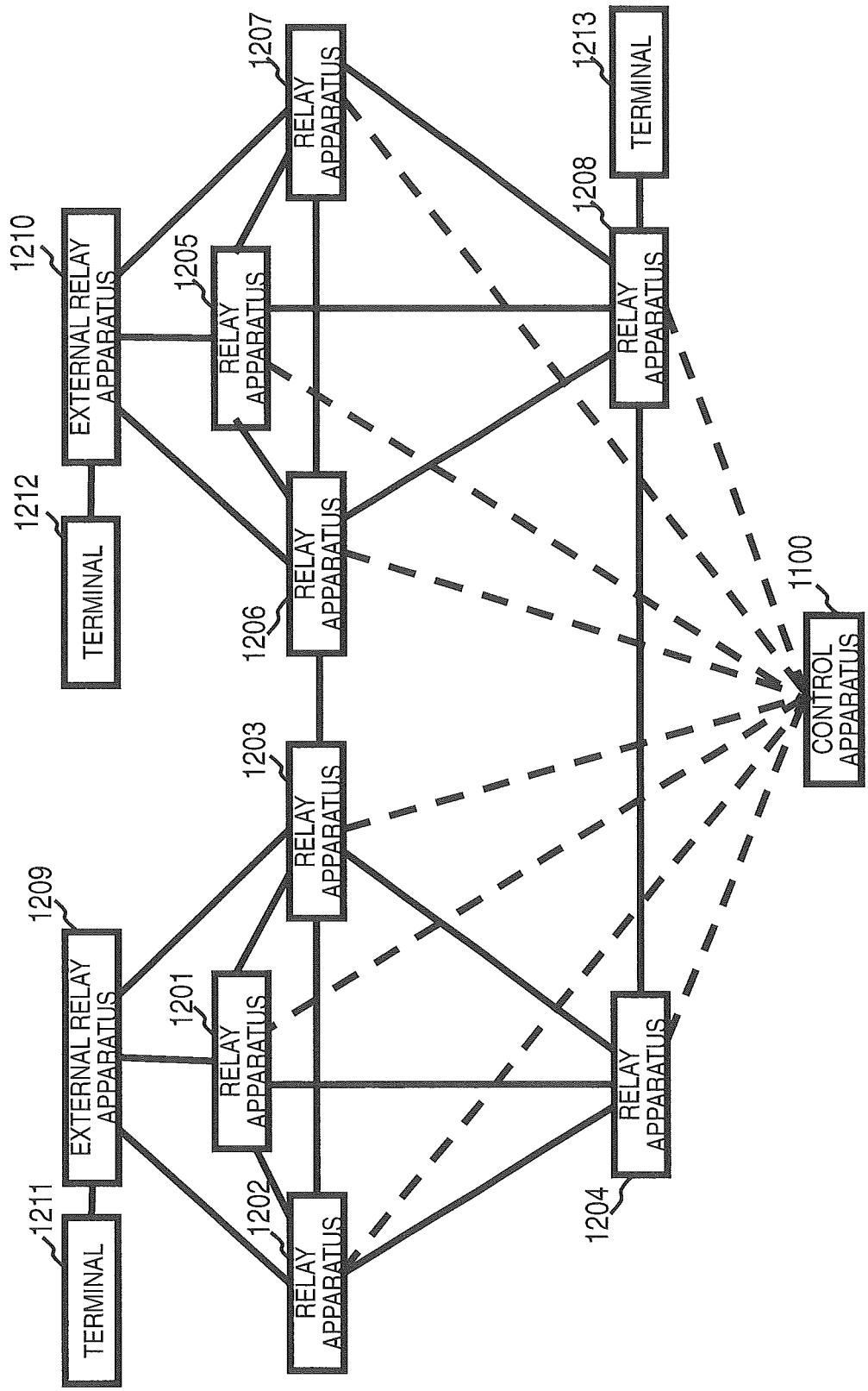
FIG. 13 illustrates a configuration according to a second exemplary embodiment of the present invention.

FIG. 13 illustrates a configuration according to a second exemplary embodiment of the present invention. The second exemplary embodiment differs from the first exemplary embodiment of the present invention in that two trunks are configured; one trunk formed by relay apparatuses 1201 to 1203 and an external relay apparatus 1209 and the other trunk formed by relay apparatuses 1205 to 1207 and an external relay apparatus 1210.

In such configuration, too, the control apparatus 1100 refers to the trunk configuration information stored in the trunk information storage unit 109 and selects a designated port from the member ports of the relay apparatuses 1201 to 1203 and a designated port from the member ports of the relay apparatuses 1205 to 1207 as described above, so that packets are forwarded from the designated ports via the stack links. In this way, control target packets such as broadcast packets can be outputted only from the relay apparatuses having the designated ports selected.

Third Exemplary Embodiment

Figure 14:
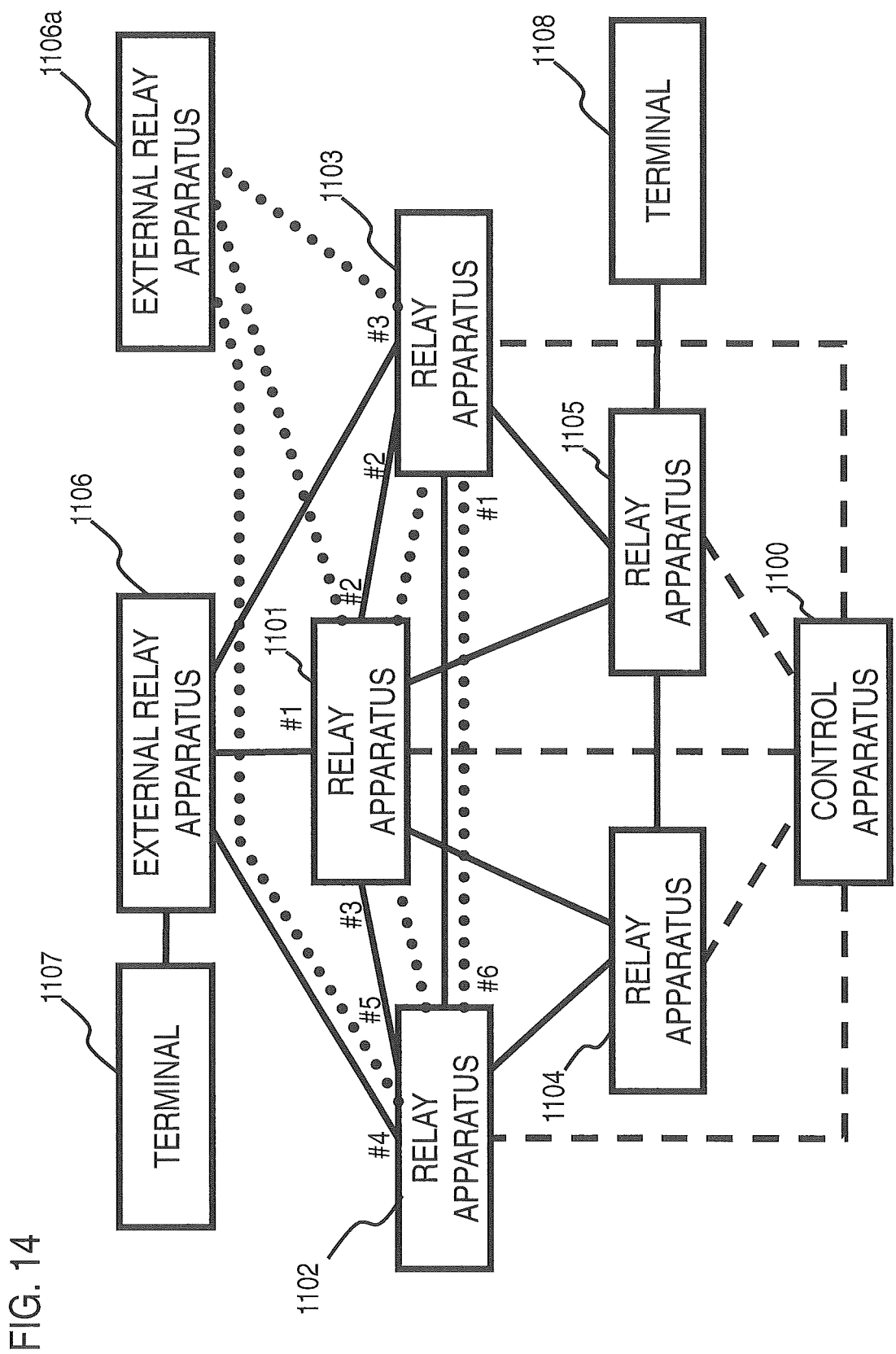
FIG. 14 illustrates a configuration according to a third exemplary embodiment of the present invention.

FIG. 14 illustrates a configuration according to a third exemplary embodiment of the present invention. The third exemplary embodiment differs from the first exemplary embodiment of the present invention in that an external relay apparatus 1106a, which constitutes a trunk different from the external relay apparatus 1106 by using other ports of the relay apparatuses 1101 to 1103, is added.

In such configuration, too, the control apparatus 1100 refers to the trunk configuration information stored in the trunk information storage unit 109 and selects a designated port from second member ports of the relay apparatuses 1101 to 1103 connected to the external relay apparatus 1106a as described above, so that packets transmitted via the external relay apparatus 1106a are forwarded from the designated port via the stack links. In this way, control target packets such as broadcast packets can be outputted only from the relay apparatuses having the designated ports selected.

Fourth Exemplary Embodiment

Figure 15:
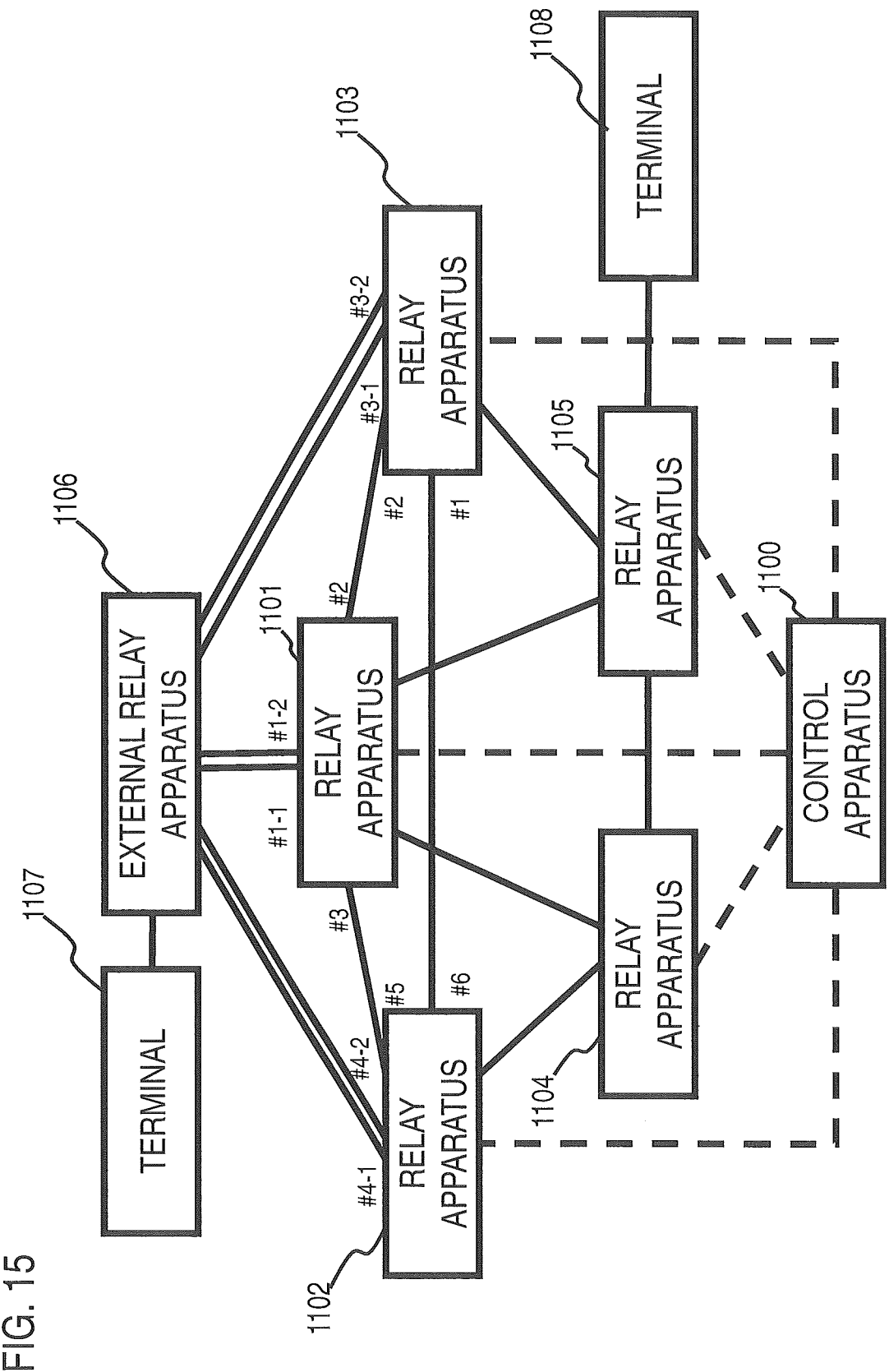
FIG. 15 illustrates a configuration according to a fourth exemplary embodiment of the present invention.

FIG. 15 illustrates a configuration according to a fourth exemplary embodiment of the present invention. The fourth exemplary embodiment differs from the first exemplary embodiment of the present invention in that a second trunk is formed by the relay apparatuses 1101 to 1103 and the external relay apparatus 1106. The member ports of the relay apparatuses 1101 to 1103 included in the second trunk may be the same as the member ports included in the first trunk.

In such configuration, too, the control apparatus 1100 refers to the trunk configuration information stored in the trunk information storage unit 109 and selects a designated port from the member ports of the relay apparatuses 1101 to 1103 included in the second trunk as described above, so that packets transmitted via the external relay apparatus 1106 are forwarded from the designated port via the stack links. In this way, control target packets such as broadcast packets can be outputted only from the relay apparatuses having the designated ports selected.

While exemplary embodiments of the present invention have thus been described, the present invention is not limited thereto. Further variations, substitutions, or adjustments can be made without departing from the basic technical concept of the present invention. For example, each of the exemplary embodiments has been described assuming that an external relay apparatus is arranged between a relay apparatus and a terminal. However, an external relay apparatus may be arranged among the relay apparatuses 1101 to 1105.

In addition, each of the above exemplary embodiments has been described based on broadcast packet forwarding control. However, packets other than broadcast packets may be used as control target packets. For example, the present invention is applicable to packets such as multicast packets that can be forwarded from an external relay apparatus to a plurality of relay apparatuses.

In addition, each of the above exemplary embodiments has been described assuming that the communication paths for data and the communication paths for control operations are arranged separately, as indicated by solid lines and dashed lines in the drawings. However, these two kinds of paths may be mixed.

The disclosure of each of the above Patent Literature and Non-Patent Literatures is incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. That is, the present invention of course includes various variations and modifications that could be made by those skilled in the art according to the overall disclosure including the claims and the technical concept.

101 relay apparatus communication unit
102 topology acquisition unit
103 topology table
104 unicast path search unit
105 unicast path control command generation unit
106 broadcast path search unit (BC path search unit)
107 broadcast path command generation unit (BC path control command generation unit)
108 trunk information input unit
109 trunk information storage unit
110 trunk control command generation unit
1100 control apparatus
1101 to 1105, 1201 to 1208 relay apparatus
1106, 1106a, 1209, 1210 external relay apparatus
1107, 1108, 1211 to 1213 terminal

What is claimed is:

1. A packet forwarding system, comprising:
a control apparatus;
a group of first relay apparatuses that are connected to each other, the group of first relay apparatuses being centrally and externally controlled by the control apparatus; and
a second relay apparatus that comprises a plurality of ports and that is connected to each of the first relay apparatuses, the second relay apparatus not being controlled by the control apparatus;
wherein the control apparatus configures a trunk(s) serving as a virtual logical link(s) by using physical links among the first and second relay apparatuses;
wherein the control apparatus determines a designated port from ports of the first relay apparatuses included in the trunk; and
wherein, when a relay apparatus included in the group of first relay apparatuses receives a predetermined control target packet, the control apparatus controls the group of first relay apparatuses to transmit the received control target packet via a relay apparatus having the designated port.

2. The packet forwarding system according to claim 1, wherein the predetermined control target packet comprises a broadcast packet or a multicast packet.

3. The packet forwarding system according to claim 1, wherein each of the first relay apparatuses comprises:
a member port that is connected to the second relay apparatus and that can be a candidate for the designated port;
a stack link port(s) that is connected to another first relay apparatus(es); and
an output port(s) that is connected to an apparatus(es) other than the first and second relay apparatuses.

4. The packet forwarding system according to claim 1, wherein the control apparatus comprises:
a trunk information storage unit that stores trunk configuration information including information about ports of the first relay apparatuses; and
a trunk control command generation unit that selects the designated port by referring to the trunk information storage unit and that controls the first relay apparatuses.

5. The packet forwarding system according to claim 4, wherein the trunk control command generation unit changes a packet forwarding path that leads to a relay apparatus having the designated port among the first relay apparatuses, based on a failure status of a stack link(s) among the first relay apparatuses.

6. The packet forwarding system according to claim 1, wherein the number of the first relay apparatuses is at least three and the first relay apparatuses are connected to each other in a ring structure.

7. The packet forwarding system according to claim 1, wherein each of the first relay apparatuses comprises a forwarding table that stores entries, in which a packet reception port, a matching condition for determining the predetermined control target packet, and an output port are associated with each other; and
wherein the control apparatus controls each of the first relay apparatuses by rewriting a forwarding table of each of the first relay apparatuses.

8. The packet forwarding system according to claim 1, wherein transmission of packets by the relay apparatuses are centrally controlled by the control apparatus.

9. A control apparatus, which is connected to a group of first relay apparatuses that are connected to each other and a second relay apparatus that comprises a plurality of ports and that is connected to each of the first relay apparatuses and which configures a trunk(s) serving as a virtual logical link(s) by using physical links among the first and second relay apparatuses;

wherein the control apparatus determines a designated port from ports of the first relay apparatuses included in the trunk; and wherein the control apparatus controls, when a relay apparatus included in the group of first relay apparatuses receives a predetermined control target packet, the group of first relay apparatuses to transmit the received control target packet via a relay apparatus having the designated port;

wherein the control apparatus centrally and externally controls the group of first relay apparatuses; and wherein the control apparatus does not control the second relay apparatuses.

10. The control apparatus according to claim 9, further comprising:

a processor; and a non-transitory computer readable medium storing a program executable by the processor in a computer, wherein the processor determines the designated port from ports of the first relay apparatuses included in the trunk; and wherein the processor controls, when the relay apparatus included in the group of first relay apparatuses receives the predetermined control target packet, the group of first relay apparatuses to transmit the received control target packet via the relay apparatus having the designated port.

11. The control apparatus according to claim 9, further comprising:

a trunk information storage unit;

a trunk control command generation unit that is configured to determine the designated port from ports of the first relay apparatuses included in the trunk from member ports stored in the trunk information storage unit; and a control unit that controls, when the relay apparatus included in the group of first relay apparatuses receives the predetermined control target packet, the group of first relay apparatuses to transmit the received control target packet via the relay apparatus having the designated port.

12. A packet forwarding method, comprising:

by a control apparatus, which is connected to a group of first relay apparatuses that are connected to each other and a second relay apparatus that has a plurality of ports and that is connected to each of the first relay apparatuses and which configures a trunk(s) serving as a virtual logical link(s) by using physical links among the first and second relay apparatuses, determining a designated port from ports of the first relay apparatuses included in the trunk; and controlling, when a relay apparatus included in the group of first relay apparatuses receives a predetermined control target packet, the group of first relay apparatuses to transmit the received control target packet via a relay apparatus having the designated port, wherein the group of first relay apparatuses are centrally and externally controlled by the control apparatus, and wherein the second relay apparatus is not controlled by the control apparatus.

13. A non-transitory computer-readable recording medium storing a program, causing a computer constituting a control apparatus, which is connected to a group of first relay apparatuses that are connected to each other and a second relay apparatus that comprises a plurality of ports and that is connected to each of the first relay apparatuses and which configures a trunk(s) serving as a virtual logical link(s) by using physical links among the first and second relay apparatuses, to execute:

determining a designated port from ports of the first relay apparatuses included in the trunk; and controlling, when a relay apparatus included in the group of first relay apparatuses receives a predetermined control target packet, the group of first relay apparatuses to transmit the received control target packet via a relay apparatus having the designated port, wherein the group of first relay apparatuses are centrally and externally controlled by the control apparatus, and wherein the second relay apparatus is not controlled by the control apparatus.

\* \* \* \* \*